United States Patent [19]

Mizikovsky

[11] Patent Number: 5,559,860
[45] Date of Patent: Sep. 24, 1996

[54] USER SELECTABLE RESPONSE TO AN INCOMING CALL AT A MOBILE STATION

[75] Inventor: Semyon Mizikovsky, Union, N.J.

[73] Assignees: Sony Corporation, Tokyo, Japan; Sony Electronics, Inc., Park Ridge, N.J.

[21] Appl. No.: 897,046

[22] Filed: Jun. 11, 1992

[51] Int. Cl.$^6$ .................................................. H04Q 7/20
[52] U.S. Cl. ........................... 379/58; 379/59; 379/63; 379/67; 379/100; 379/142; 379/374; 379/375
[58] Field of Search .................................. 379/58, 59, 63, 379/100, 127, 142, 201, 110, 67, 88, 374, 375

[56] References Cited

U.S. PATENT DOCUMENTS

| | | | |
|---|---|---|---|
| 4,266,098 | 5/1981 | Novak | 379/142 X |
| 4,481,382 | 11/1984 | Villa-Real | 379/61 |
| 4,646,347 | 2/1987 | Liu | 379/375 |
| 4,903,298 | 2/1990 | Cline | 379/62 X |
| 4,922,490 | 5/1990 | Blakley | 379/142 X |
| 4,977,609 | 12/1990 | McClure | 379/59 X |
| 5,029,196 | 7/1991 | Morganstein | 379/67 |
| 5,033,079 | 7/1991 | Catron et al. | 379/100 |
| 5,127,041 | 6/1992 | O'Sullivan | 379/59 |
| 5,189,632 | 2/1993 | Paajanen | 379/59 X |
| 5,220,594 | 6/1993 | Ohnishi et al. | 379/61 |

FOREIGN PATENT DOCUMENTS

| | | | |
|---|---|---|---|
| 2193861 | 2/1988 | United Kingdom | 379/59 |
| 2216319 | 10/1989 | United Kingdom | 379/61 |

*Primary Examiner*—Curtis Kuntz
*Assistant Examiner*—G. Oehling
*Attorney, Agent, or Firm*—William S. Frommer; Alvin Sinderbrand

[57] ABSTRACT

An apparatus for selectively answering an incoming call transmitted from a cellular base station to a mobile station based upon the telephone number of a calling party. An ID processor is programmed by a user of the mobile station to store selected telephone numbers corresponding to calling party telephone numbers, which serve to uniquely identify the calling parties. The processor is also programmed by the user to select predetermined response categories and to assign desired ones of those response categories to each of the stored calling parties' telephone numbers. When an incoming call is received at the mobile station, the calling party's telephone number is compared with the stored telephone numbers, previously programmed by the user, to detect an incoming call from a particular calling party. Depending upon the response category assigned to incoming calls from that particular calling party, the selected response is initiated. Responses to the incoming calls include distinctive ringing (to indicate high or low priority or long distance calls), the activation of a voice message recorder, communication scrambling device, facsimile device, data modem, or a cartographic display.

7 Claims, 5 Drawing Sheets

USER SELECTABLE RESPONSE TO AN INCOMING CALL AT A MOBILE STATION

BACKGROUND OF THE INVENTION

This invention relates to cellular telephone apparatus and, more particularly, to apparatus normally provided at a mobile station for selectively answering an incoming call transmitted as an "alert with information" message, such that calls from different calling parties are answered differently.

When a telephone call is destined for a mobile station in a cellular telephone system, a mobile telephone switching office (MTSO) transmits calling information to a base station which services a service cell in which the mobile station is located. As is conventional, such as described in *Mobile Cellular Telecommunications Systems* by William C. Y. Lee, McGraw-Hill Book Company (1989), the base station, in turn, transmits a suitable control message to the mobile station over a forward control channel to command the mobile station to change over from its idle mode to an active mode. Communication from the base station to the mobile station then proceeds over a forward voice channel; and the mobile station is apprised of an incoming telephone call by means of an "alert" message transmitted thereto over the forward voice channel. The "alert" message generally includes various codes arranged as multi-bit information words to identify the type of message being transmitted, the number of words included in the message, and various other types of information that are used in cellular telephone systems. The specifics of such codes and messages are detailed in EIA standards, such as EIA/TIA-IS-54.

A typical "alert" message is intended to produce an alert, or warning, indication at the mobile station so as to apprise the user of the presence of an incoming telephone call. The typical warning indication is the generation of an audible signal, generally referred to as an audible ringing signal. Presumably, the called party, that is, the user of the mobile station, cannot distinguish between incoming calls; and the user is provided with but two options: answer or ignore the incoming call. If the mobile station is located in a vehicle, the presence of the audible ringing signal may be a distraction to the user whose concentration on operating the vehicle will be interrupted when the warning indication is generated and the call is answered.

As so often happens, the user at the mobile station may prefer not to communicate with the calling party. In other cases, voice communication with the calling party may not be needed and other responses to the incoming call may be more appropriate. However, since the user simply is provided with an audible ringing signal, the user cannot distinguish desirable calls from those which are undesired or calls which invite voice communication from those that do not. Nor can the user assess the priority of an incoming call.

It recently has been proposed to transmit additional information with the "alert" message. This additional information may be of the type which, for example, represents the importance of the incoming call, the type of call, the medium through which the call is transmitted, etc. However, a more desirable "alert with information" message would be one which includes information that identifies the calling party. In the present standard, an "alert with information" message is transmitted over a forward voice channel in "packets," with each packet including one or more multi-bit words. While several of the bits in a packet are used for control purposes, many are dedicated to identify the calling party, such as the telephone number used by the calling party to initiate the telephone call. The transmission of several words thus provides sufficient cumulative information to identify the calling party.

However, the typical use of the calling party identifying data included in the "alert with information" message has been simply to display the calling party's identity or telephone number. While this provides the user at the mobile station with additional information on which a decision can be made as to whether the incoming telephone call should be answered, the user must observe the display before taking action. Thus, the incoming audible ringing signal and the need to view a display still distracts the user.

OBJECTS OF THE INVENTION

Therefore, it is an object of the present invention to provide improved apparatus for use in a cellular telephone system for detecting incoming calls from particular calling parties and providing pre-programmed responses to such calls.

Another object of this invention is to provide a technique for responding to incoming calls in a cellular telephone system without distracting the user thereof.

Still another object of this invention is to provide a method and apparatus for selectively answering an incoming call transmitted to a cellular telephone mobile station, in which the answer to that incoming call is a pre-programmed function of the identity of the calling party.

A further object of this invention is to provide a method and apparatus for enabling the user of a cellular telephone mobile station to assign different response categories to particular calling parties so that a call from one of those parties is answered in a manner previously selected by the user.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for selectively answering an incoming call transmitted from a cellular telephone base station to a mobile station as an "alert with information" message containing calling party identifying data. Identifying data representing particular calling parties are selected by the user, as are predetermined response categories, each representing a respective type of response to an incoming call. Desired ones of those response categories are assigned by the user to those particular calling parties which have been selected. When an "alert with information" message is received, the calling party identifying data therein is compared to the identifying data selected by the user; and when a comparison is found, the type of response that had been assigned to that calling party is initiated.

Examples of different types of responses include a distinctive ringing indicator to identify an incoming call having high priority, an incoming call to which a relatively high tariff has been allocated (e.g. a long distance call) or an incoming call having relatively lower priority. Another type of response includes a muted ringing alert, whereby the user is not informed of the receipt at the mobile station of an incoming call.

Still other types of responses include the activation of a peripheral device included in or coupled to the mobile station upon the receipt of an incoming call from a particular calling party. The peripheral device may be a scrambler which provides scrambled communication between the mobile station and the calling party, a voice recorder, such as a telephone answering machine, voice mail system, or the like, to record a message from the calling party without intervention by the user at the mobile station, or a data recorder to record automatically digital data that is transmitted to the mobile station by the calling party.

Other examples of a peripheral device include a data modem, a data processing terminal or a facsimile device. With these, the user need not be interrupted from a present task, such as navigating his vehicle, to receive an incoming call from particular calling parties.

Yet another example of a peripheral device that may be used with the present invention is a traffic information display which receives data representing the locations of vehicular traffic congestion and displays on an electronic road map the locations of such congestion.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

It is assumed that the reader is familiar with cellular telephone systems and the manner in which messages are transmitted between a base station serving a particular service cell and a mobile station located within that cell. To simplify the present description, only that portion of a cellular telephone system that is relevant to the present invention is discussed. For convenience, this invention is described in the environment of an analog mode of operation of a cellular telephone system, such as established by EIA/TIA 553. However, and as will be described, the present invention also admits of a digital mode of operation of the type recently proposed by the EIA/TIA in IS-54 Rev. B.

Figure 1:
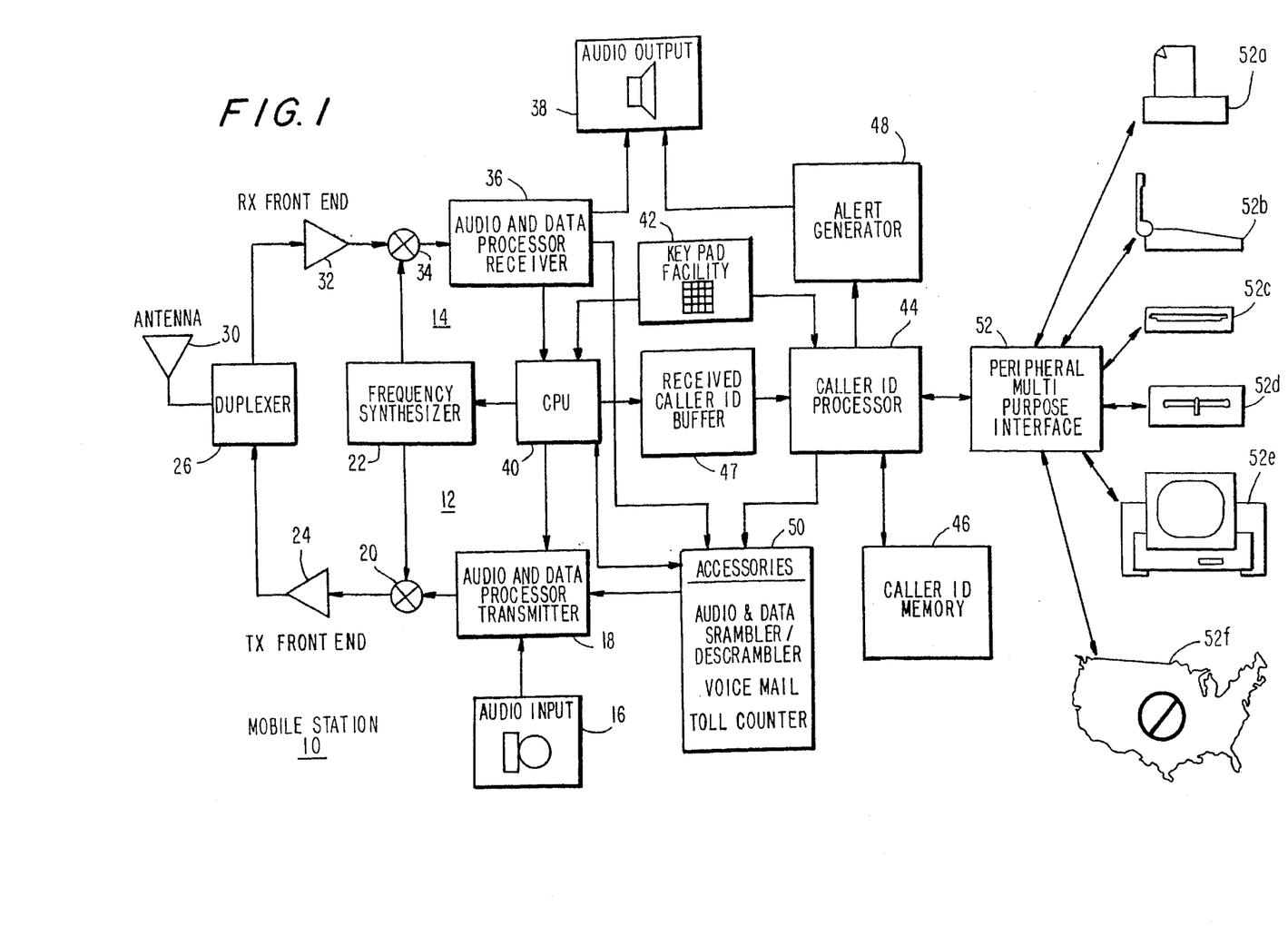
FIG. 1 is a block diagram of apparatus in accordance with one embodiment of the present invention.

Turning now to FIG. 1, there is illustrated a block diagram of a mobile station 10 which includes conventional modules and which also is illustrated as comprising additional modules, or circuits, in accordance with an embodiment of the present invention. The mobile station may be included in a vehicle or may be a hand-held device, both of which are known to those of ordinary skill in the art. As illustrated, mobile station 10 includes a transmitter section 12, a receiver section 14 and an antenna 30 for receiving messages and data from and transmitting messages and data to a base station. The mobile station is adapted to exhibit three different modes: a power-off mode, an idle mode and an active mode. In a power-off mode, no signals are transmitted from or received by the mobile station and, for all practical purposes, its presence is not recognized by the cellular telephone system of which it is a part. In the idle mode, the mobile station is prepared to initiate an outgoing telephone call or receive an incoming telephone call. In this mode, control messages are transmitted thereto from the base station and other control messages are returned from the mobile station to that base station. The base station normally transmits control messages over dedicated control channels; and when the mobile station is in its idle mode, it is tuned to the strongest dedicated control channel. The control messages which are received by the mobile station over the control channel are supplied by way of antenna 30 and receiver section 14. The particular control messages which are transmitted by the base station while the mobile station is in its idle mode form no part of the present invention per se; and further description thereof is not provided.

An active mode of the mobile station may be initiated either when the user thereof wishes to transmit an outgoing telephone call to a remote party or the mobile station answers an incoming telephone call from a calling party. The present invention is concerned with responses by the mobile station to an incoming call. As is conventional in cellular telephone systems, an incoming telephone call is transmitted from the base station to the mobile station as an "alert" message. Preceding this "alert" message are various control messages transmitted from the base station to the mobile station over a forward control channel and other control messages returned from the mobile station to the base station over a reverse control channel. In response to these control messages which precede the "alert" message, the mobile station is changed over to its active mode and thereafter receives control messages as well as useful information (e.g. voice information) from the base station over a forward voice or traffic channel. Other control messages and useful information (here too, such as voice information) are returned from the mobile station to the base station over a reverse voice or traffic channel. It is recognized, therefore, that in its active mode, the mobile station is tuned to predetermined forward and reverse voice or traffic channels and now is conditioned to receive an "alert" message.

Various types of "alert" messages are transmitted from a base station to a mobile station in the typical cellular telephone system. The present invention is concerned with an "alert" message that represents an incoming telephone call. More particularly, and in accordance with the aforementioned standard EIA/TIA IS-54, the occurrence of an incoming telephone destined for the mobile station is represented as an "alert with information" message. Here, the "information" identifies the calling party. One example of calling party identifying data included in the "alert with information" message is the telephone number of the calling party. It is contemplated, however, that other identifying data may be included in the "alert with information" message, such as the name, organization, location, etc. of the calling party. As will be explained, mobile station 10, as illustrated in FIG. 1, utilizes this "alert with information" message to trigger a particular response, or answer, to the incoming call. First, however, further reference is made to the construction of mobile station 10.

Transmitter section 12 is seen to be comprised of an audio input 16, such as a microphone, an encoder 18, a modulator 20 and a duplexer 26. The audio input, or microphone is adapted to generate analog electrical signals in response to voice signals supplied thereto by, for example, the user. Audio input 16 is coupled to encoder 18 which is adapted to digitize and encode the voice signals produced by the audio input; and those digitized voice signals are supplied to modulator 20 whereat they are suitably modulated onto a carrier generated by a frequency synthesizer 22. Typically, the encoded audio information, also referred to as encoded audio data, is modulated by modulator 20 in accordance with conventional modulation techniques, such as frequency modulation (as per EIA/TIA-553) or π/4 shifted differential quadrature phase shift keying (as per EIA/TIA IS-54) or other known modulation. It is seen from FIG. 1 that modulator 20 is coupled to duplexer 26 by an amplifier 24. The duplexer is adapted to transmit modulated, encoded data to antenna 30, whereby such data is returned to the base station over the reverse voice or traffic channel.

As will be described below, encoder 18 functions not only to digitize and encode audio information received from audio input 16, but it also is adapted to encode other data and information supplied thereto from various accessories that may be connected to the mobile station. The operation of encoder 18 to encode voice information or such other data is controlled by a central processing unit (CPU) 40, which may be a commercially available microprocessor.

Receiver section 14 is comprised of a demodulator 34, a decoder 36 and an audio output 38, the latter preferably being a speaker. Demodulator 34 is coupled to duplexer 26 by an amplifier 32 to receive modulated data transmitted to antenna 30 of the mobile station from a base station. The demodulator also is coupled to frequency synthesizer 22 to receive a demodulating signal for recovering the received modulated data. It will be appreciated that modulator 20 and demodulator 34 are compatible such that the demodulator is adapted to decode quadrature phase shift keyed signals. The output of demodulator 34 is coupled to decoder 36 which complements encoder 18 and recovers analog audio signals that may be received by the mobile station. Decoder 36 is coupled to audio output 38 to supply the decoded audio signals thereto, whereupon audible sound, such as voice signals, are reproduced.

Decoder 36 also is adapted to recover control signals received from the base station via the forward voice or traffic channel and to couple such control messages to CPU 40. Additionally, the decoder functions to decode other data and information that may be received from a remote party, and is coupled to one or more accessory devices 50, to be described, to supply thereto such data and information received from the base station. For example, if the accessory device includes a voice recorder, incoming voice messages may be decoded and coupled to the voice recorder under conditions to be explained below.

CPU 40 is coupled to encoder 18, frequency synthesizer 22 and decoder 36 for controlling the operations of these individual devices. For example, the frequency synthesizer is controlled by the CPU to synthesize carrier frequencies assigned to different control and voice channels, as is conventional in cellular telephone systems. Encoder 18 is controlled by the CPU to encode the usual control messages normally transmitted to the base station over reverse control and reverse voice or traffic channels. CPU 40 also is coupled to accessory device (or devices) 50 to enable the operation of such device (or devices) under the conditions explained below.

A keypad 42 is provided at mobile station 10 to generate numerical and control data in response to manual operation thereof by the user. The keypad is conventional and includes the usual keys normally provided on a telephone handset as well as other keys conventionally provided on cellular telephone handsets known to those of ordinary skill in the art. Keypad 42 is coupled to CPU 40 to supply keying data thereto in conventional manner.

Elements 12-42 are found in almost all conventional mobile stations in cellular telephone systems. Accordingly, a detailed discussion of the manner in which these elements operate to transmit information to and receive information from a base station need not be provided. The present invention is directed, more particularly, to a caller ID processor 44, a caller ID memory 46, an alert generator 48, an accessory device (or devices) 50 and a peripheral interface 52. Caller ID processor 44 is coupled to keypad 42 and is operable in a programming, or set up, mode to assemble identifying data representing a particular calling party as may be generated by the operation of the keypad. The caller ID processor also is adapted to generate data representing a response category that the user wishes to assign to the assembled calling party identifying data. It will be appreciated that keypad 42 is operated to generate the calling party identifying data, such as the telephone number of a particular calling party, and the predetermined response category assigned to that calling party. In the preferred embodiment, the user selects several calling parties to be identified simply by operating the keypad to generate the telephone number of each such calling party and by further operating the keypad to generate a predetermined response category for that calling party. Examples of response categories include, but are not limited to, a distinctive type of ringing indication, also known as an alert, to notify the user accordingly. For example, the ringing indication may indicate that an incoming call is received from a calling party to which the user has previously assigned a high priority. Alternatively, the indication may be indicative of an incoming call received from a calling party to which the user has assigned a relatively low priority, for example, an undesired caller. Still further, various distinctive ringing indications may be assigned to different calling parties, such that when an incoming telephone call is received from one, a ringing indication apprises the user of the relative priority that has been assigned to that calling party.

Another response category may be a muted ringing alert, whereby no indication is provided the user when an incoming call is received from a calling party to which this particular response category has been assigned. Typically, the user will assign this muted ringing alert response category to calling parties whose incoming calls the user does not wish to answer.

Yet another response category contemplated herein is identified generally as an accessory response. Various types of accessory devices 50 may be coupled to the mobile station and may be activated when an incoming call is received from a calling party to which the user previously has assigned an accessory device response. For example, the accessory device may include a voice recorder, such as a telephone answering machine, which is activated when an incoming call is received from a calling party to which a voice recorder response category has been assigned. Another example of an accessory device is a voice mail device, which is seen to be quite similar to the aforementioned voice recorder. Yet another accessory device that may be used with the present invention is a scrambler for descrambling information received by the mobile station from the base station and/or to scramble information returned from the mobile station to the calling party. Thus, the mobile station may be used in sensitive, highly classified applications such that when an incoming call is received from a highly classified source, communication between the mobile station and that source is scrambled to minimize unauthorized detection or disclosure thereof.

The mobile station also may be used with other accessory devices which are illustrated in FIG. 1 as peripheral devices. Examples of such peripheral devices include a facsimile device 52a, a data processing terminal 52b, a data modem 52c, a data recorder 52d and a multimedia terminal 52e. Other peripheral devices also may be used, but in the interest of brevity only the foregoing examples are shown. These peripheral devices are coupled to a peripheral interface 52 which, in turn, is coupled to caller ID processor 44. In response to the operation of keypad 42, the user may assign to selected calling parties a peripheral response category such that when an incoming call is received from that calling party, the appropriate peripheral device coupled to interface 52 is activated for communication with that calling party. The peripheral device is activated without intervention by the user such that the calling party may communicate with that peripheral device. Hence, and as one example, if a facsimile response category is assigned to a particular calling party, an incoming call received from that calling party activates facsimile device 52a and initiates an appropriate communication protocol at interface 52 such that an incoming facsimile message is received and indicia are printed automatically. Alternatively, if the user of the mobile station has previously prepared facsimile device 52a for the transmission of a facsimile message, an incoming call from that calling party will activate the automatic transmission of that facsimile message.

As another example, a computer response category may be assigned to a different calling party such that data processing terminal 52b is activated automatically when an incoming call is received from that calling party. Data from the calling party thus may be received and processed; and data may be transmitted from the mobile station to the calling party.

As a further example, a data modem response category may be assigned to a still further calling party such that an incoming call received from that further calling party activates data modem 52c to facilitate data communication between that further calling party and a data device connected to the data modem. Thus, it is seen that, by assigning different types of peripheral response categories to different calling parties, the particular peripheral device that may be coupled to peripheral interface 52 is activated automatically when an incoming call is received from a calling party to which that peripheral device response category has been assigned.

Still another peripheral device shown in FIG. 1 is a cartographic display 52f. This cartographic display comprises an "electronic road map" which displays to the user a map of roadways selected by him. For example, a local road map may be displayed on a video screen. It is contemplated that a traffic information supply service may transmit, from time to time, to subscribers to that service, by way of the cellular telephone system, information representing the locations of traffic congestion. To receive this information, the user operates keypad 42 to enter the telephone number of that traffic information service and assigns thereto a cartographic display response category. Hence, when an incoming call is received from that traffic information service, cartographic display 52f is activated and information of traffic congestion is received and displayed. The user thus is apprised of the locations of traffic congestion and may take remedial steps to avoid such congestion.

Caller ID memory 46 is coupled to caller ID processor 44 and is adapted to store the identifying data entered by way of keypad 42 together with the response category assigned to that identifying data by the user. In one embodiment, such identifying data is the telephone number of the calling party and the assigned response category may be any of the response categories discussed above.

The caller ID processor also is coupled to a calling party ID buffer 47 which, in turn, is coupled to CPU 40 and is adapted to receive from the CPU the calling party identifying data included in an "alert with information" message that is transmitted to the mobile station from a base station. Caller ID processor 44 is adapted to compare the received calling party identifying data with the identifying data previously stored in caller ID memory 46 to determine if the calling party is one of the previously selected, or pre-programmed calling parties. If so, the response category that had been previously assigned to that calling party is used to trigger the pre-programmed response.

The manner in which keypad 42 is used by the user to select calling parties and to assign particular response categories to such calling parties now will be explained in conjunction with the flow chart shown in FIG. 2. Let it be assumed that the keypad is operated to initiate the preprogramming mode 102. It is appreciated that a suitable key or combination of keys may be operated to initiate the preprogramming mode. The user then has the option of deleting identifying data that had previously been selected to identify a calling party and that had been stored in caller ID memory 46 or of entering identifying data which identifies a new calling party. Here too, a suitable key or combination of keys may be actuated to delete old caller identifying data 104 or to enter new caller identifying data 106.

If new caller identifying data is entered, a response category is assigned thereto, as represented by block 108. Some examples of response categories include a priority caller 110, an undesired caller 112, an accessory response 114 and a peripheral interface response 116. If the calling party identified by the caller identifying data is to be assigned priority status, keypad 42 is operated to assign a suitable response category thereto. For example, a selected alert signal 120, such as a distinctive ringing indication, may be assigned to this calling party. As mentioned above, a distinctive ringing indicator may be used as an indication of a priority caller. Alternatively, alternate routing 122 for the incoming call may be selected so that this priority call does not remain unanswered. This is analogous to the conventional telephone system optional service generally known as "call forwarding".

If the caller identified by the newly entered caller identifying data is an undesired caller, as represented by block 112, to which the user does not wish to respond, then various response categories may be assigned to this calling party. For example, a voice mail response 130 may be selected such that an incoming call from this calling party activates a voice mail system to record the message received from the calling party without apprising the user at the mobile station and without requiring intervention by that user.

Another response category that may be assigned to this undesired caller by the user is caller ID reporting 132. Here, a voice synthesizer may be triggered to provide a verbal report, or indication, of the calling party. Such verbal report may include the name of the calling party, the telephone number of the calling party, or the like.

Still another response category that may be assigned to this undesired caller is the selection of alternate routing 134, similar in principal to the selection of alternate routing 122 that may be assigned to a priority caller, but performed in a different manner, for instance, to discourage the caller or delegate the processing, or handling, of this call. A still further response category that may be assigned to this undesired caller is one which simply ignores the incoming call, as represented by block 136. For example, when an incoming call is received from this calling party, no ringing indication is provided, or the ringing alert is muted, and, thus, the user is not apprised of the presence of this incoming call. That is to say, the incoming call is ignored.

If the user assigns the accessory response category 114 to the newly entered caller identifying data, a particular accessory may be selected such that when an incoming call is received from this caller, the selected accessory is activated. Examples of such accessories include a voice mail system 140, similar to voice mail system 130 that may be assigned to an undesired caller, a scrambler 142, whereby an incoming call received from this caller activates the scrambler and further communication between that caller and the mobile station is scrambled, or a toll counter 144.

If the user assigns the peripheral response category 116 to the newly entered caller identifying data 106, a desired one of the indicated peripheral devices may be selected. The selected peripheral device may be a data modem 150, a computer terminal 152, a voice/data recorder 154, a printer 156, a facsimile device 158, a multi-media terminal 160, navigational equipment 162 or a cartographic display of road information 164. Depending upon which of these peripheral devices is preselected, an incoming call received from this calling party will initiate the proper interface protocols and activate the peripheral device that has been so preselected and assigned to this caller identifying data.

It will be appreciated that caller ID memory 46 operates to store the caller identifying data entered by keypad 42, as represented by block 106, as well as the particular type of response 120-164 that has been assigned to this calling party.

Figure 3:
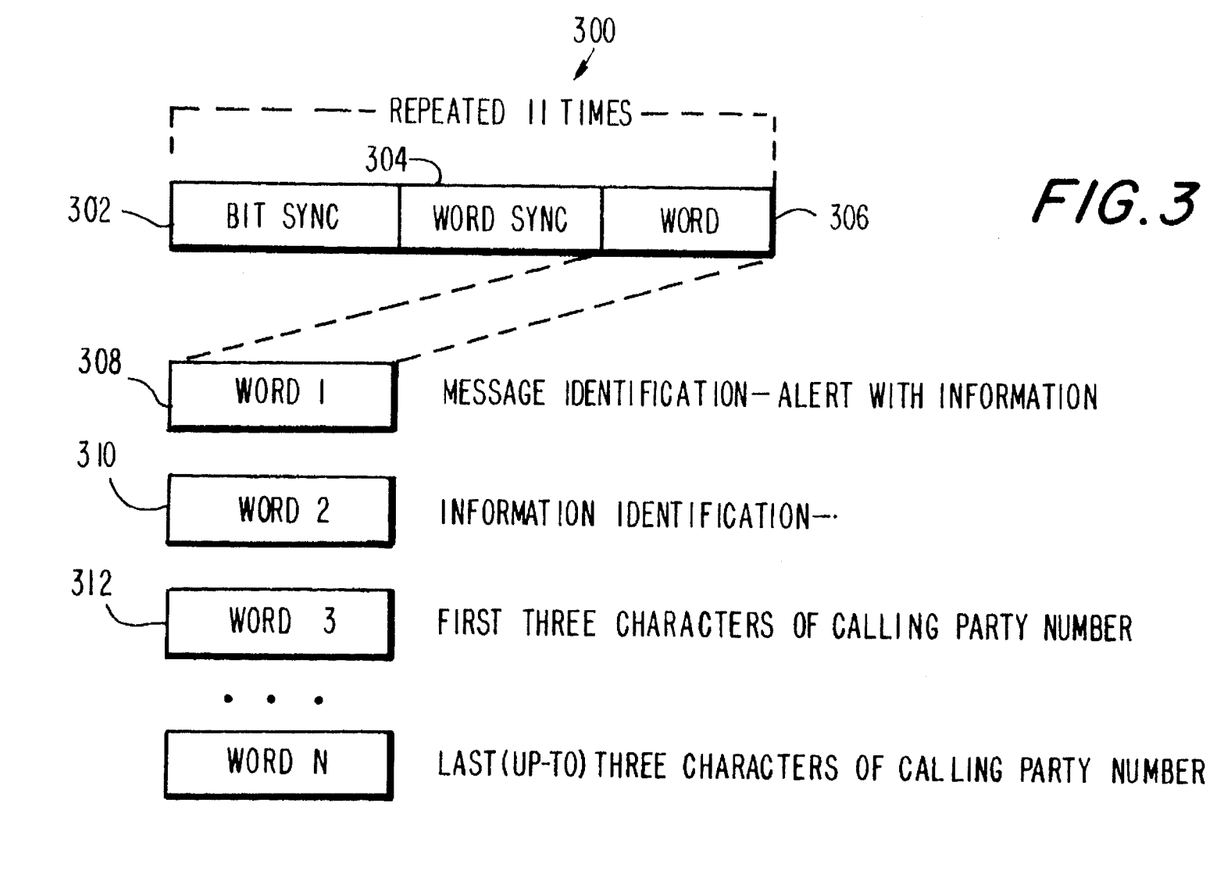
FIG. 3 is a schematic representation of an "alert with information" message that may be transmitted on a forward voice channel in a cellular telephone system.

Once the user has programmed caller ID memory 46 to store both the identifying data representing particular calling parties, such as the telephone numbers of those calling parties, and the response category, or type of response, assigned to each such calling party, mobile station 10 awaits the receipt of an "alert with information" message which represents an incoming telephone call. In what has been referred to as an analog cellular telephone system, the "alert with information" message is transmitted from the base station to the mobile station on the forward voice channel. In digital cellular telephone systems of the type recently standardized by the industry, the "alert with information" message is transmitted on the forward digital traffic channel. The format of an "alert with information" message that is transmitted on the forward voice channel is represented in FIG. 3.

As discussed above, an "alert with information" message is transmitted in packets 300. Typically, a packet is comprised of two or more words 306 (shown in FIG. 3), containing the actual message information. Each of these words 306 is formed by encoding 28 content bits into a 40-bit-by-BCH code for error protection. A 37-bit Bit Sync sequence 302 and an 11-bit Word Sync sequence 304 precede each word 306, thereby comprising a word block 300.

As is conventional, each word block 300 is transmitted a predetermined number of times to account for the possibility that all, or at least a portion of, a transmitted packet may not be accurately received because of interference, atmospheric distortions, and the like. In accordance with one protocol, each word block is re-transmitted eleven times in succession to assure its accurate reception and detection.

In the first word block, the word 308 generally identifies the message as an Alert With Information message. In applicable standards it is identified usually as the Word 1—Mobile Station Control Message. The second word block contains word 310, usually identified as Word 2—First Alert With Information. This word represents alert parameters. The Calling Party identifying data, such as the telephone number of the calling party, typically begins with the third word 312 of FIG. 3. Depending upon the amount of information that is needed to suitably identify the calling party, N words are used (where N is variable).

As an example, each word (beginning with the third word) includes three 8-bit characters, and each character identifies a digit or other alphanumeric character included in the calling party identifying data. For example, each character may represent a digit of the telephone number of the calling party.

The total number of packets which are transmitted is variable, depending upon the length of the message constituted by the packets; and it will be appreciated that the total number of characters which comprise calling party identifying data likewise may be variable. For example, the calling party identifying data may contain a 10-digit telephone number, a 12-character alphanumeric representation of the calling party, a 20-digit representation of the transmission path by which the telephone call is transmitted from the calling party to the mobile station, and the like.

Figure 4:
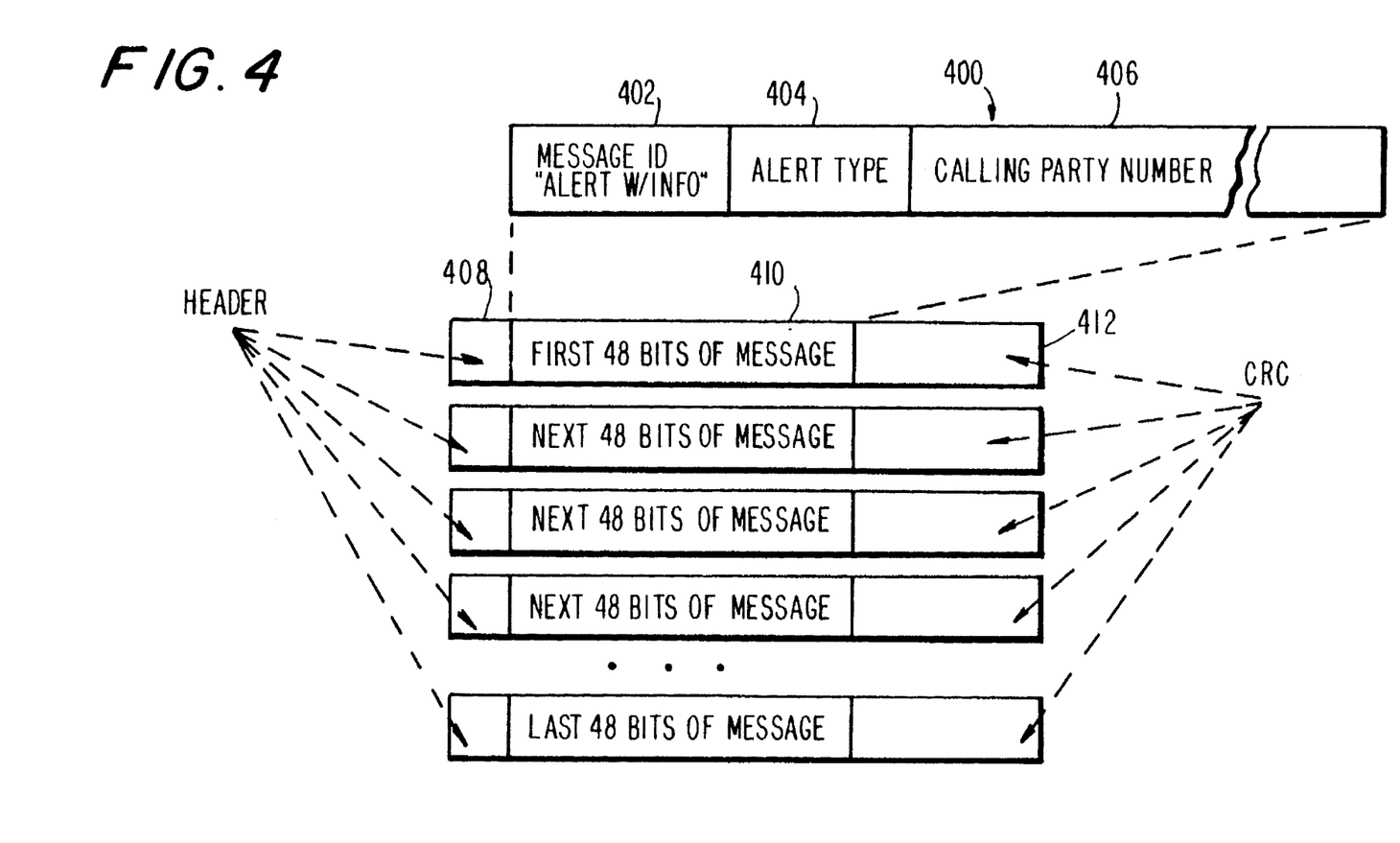
FIG. 4 is a schematic representation of an "alert with information" message that may be transmitted on a forward digital traffic channel in a cellular telephone system.

While FIG. 3 schematically illustrates the format of an "alert with information" message transmitted on the forward voice channel in what has been referred to as an analog cellular telephone system, FIG. 4 schematically illustrates the format of an "alert with information" message that is transmitted on the forward digital traffic channel in a digital cellular telephone system. Here too, the message is transmitted as a succession of transmission frames comprising a packet 400, with each packet containing identifying data plus information words. As shown, the identifying data in a packet 400 includes message identifying bits 402, followed by bits 404 further identifying the type of alert, followed by useful message information 406. When packet 400 is included in an "alert with information" message, the message identifying bits 402 identify this message as an "alert with information" message. Bits 404 identify the type of "alert with information" message; and in the present example, the type of "alert with information" message is an incoming call with calling party identifying data. Word 406 includes a portion of that calling party identifying data, such as a plurality of digits included in the calling party telephone number, a plurality of alphanumeric characters that may be used to identify the calling party, etc.

FIG. 4 illustrates the transmission of packet 400 in successive frames. Each frame contains a portion of a packet 400 with 48 consecutive bits. Moreover, each frame begins with a header 408 and ends with a final suffix 412 which is used for error detection, and may include, for example, a CRC code. In one embodiment, the "alert with information" message transmitted on the forward digital traffic channel is comprised of a variable number of frames depending upon the number of words needed to provide the calling party identifying data and, therefore, the total length of packet 400. Alternatively, a fixed number of frames may be used for all messages transmitted over the forward digital traffic channel; and those frames which are not needed for calling party identifying data may be comprised simply of "filler" bits. For example, if the fixed number of frames is adequate to represent a 20-digit calling party identifier, but only 10 digits are needed to identify the calling party's telephone number, then those frames which otherwise would be used to represent the last 10 digits of such 20-digit number simply contain filler bits.

Let it be assumed that the user of mobile station 10 has pre-programmed caller ID memory 46 with identifying data representing particular calling parties, for example, the telephone number of each such calling party, and has assigned a response category to each programmed, or stored number. Stated otherwise, the user has preselected a type of response that will be made to incoming telephone calls received from each of the identified calling parties. Now, the manner in which a response is made to an incoming call will be described with reference to the flow chart of FIG. 5 and the block diagram of FIG. 1.

Initially, it is assumed that suitable control messages have been transmitted from the base station to mobile station 10 to dispose the mobile station in its active mode. Accordingly, when the "alert with information" message is received by antenna 30 it is coupled to CPU 40 by way of duplexer 26, amplifier 32, demodulator 34 and decoder 36. The CPU detects the "alert with information" message and supplies the calling party identifying data (e.g. the telephone number of the calling party) included in the received message to calling party ID buffer 47. The calling party ID buffer assembles the received calling party identifying data, as represented by instruction 504 (FIG. 5) and supplies the calling party identifying data to caller ID processor 44. The processor includes a comparator for comparing the received calling party identifying data to the identifying data that had been previously selected and stored in caller ID memory 46. This comparison operation is represented by instruction 506.

As the contents of the ID memory are searched for a comparison between the received calling party identifying data and the previously selected identifying data, the response category assigned to each previously selected identifying data also is sensed. This scanning and comparison operation is represented by the inquiries shown in FIG. 5. Accordingly, inquiry 508 is made to determine if the calling party, as represented by the calling party identifying data assembled by calling party ID buffer 47, is a calling party to which a priority response has been assigned. If not, inquiry 512 is made to determine if this calling party is an undesired caller. If not, inquiry 516 is made to determine if an accessory response has been assigned to this calling party. If not, inquiry 520 is made to determine if a peripheral response has been assigned to this calling party. If not, inquiry 522 is made to determine if this calling party is a long distance caller. For example, that portion of the calling party identifying data which represents the area code from which the calling party places his call is examined to sense if such area code differs from the area code of the service cell in which mobile station 10 presently resides. If inquiry 522 is answered in the negative, instruction 526 is carried out, whereupon alert generator 48 is activated by caller ID processor 44 to initiate a "regular" alert, such as a normal ringing indication. It may be appreciated that instruction 526 functions as a default response.

Figure 5:
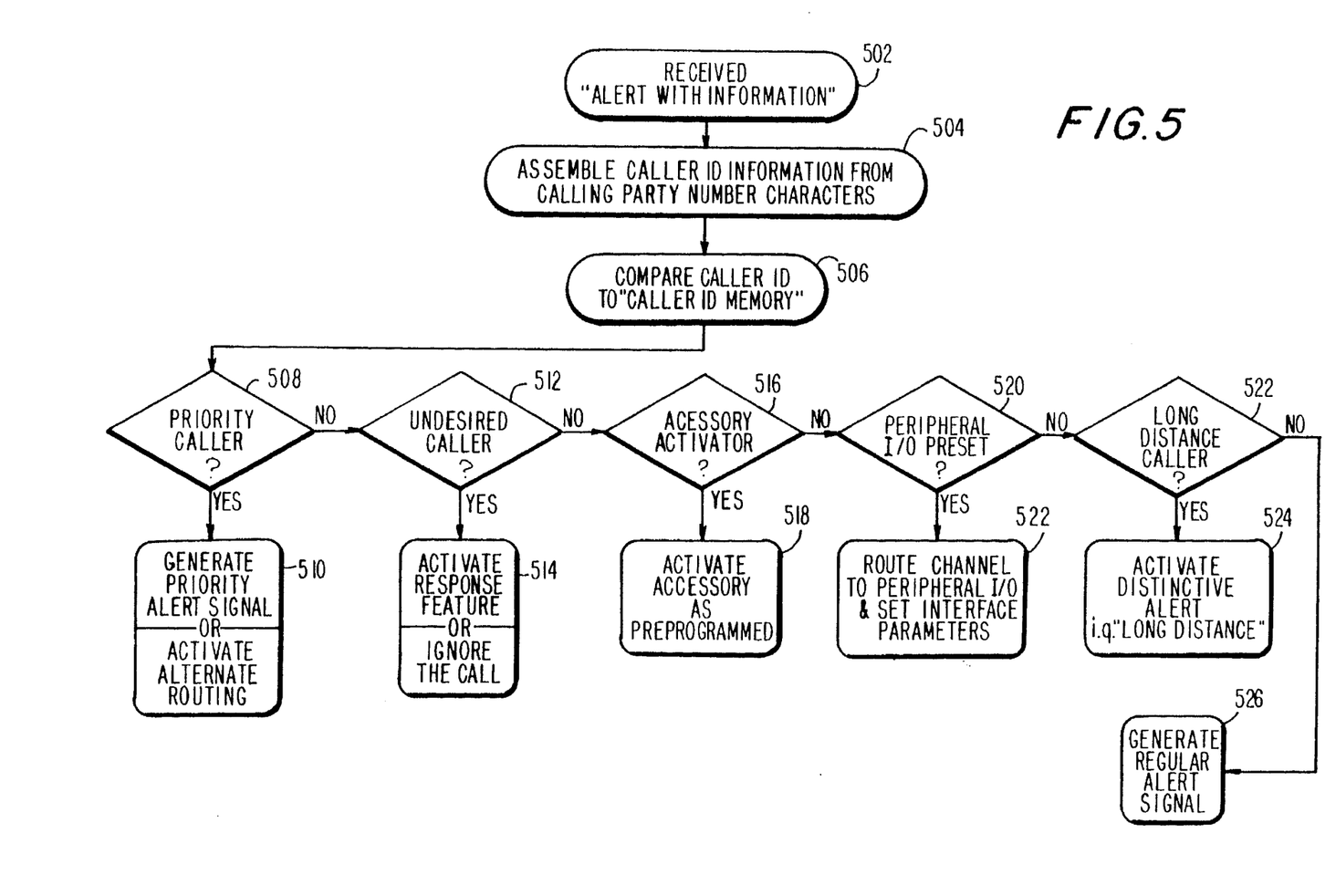
FIG. 5 is a flow chart representing the manner in which a mobile station responds to an "alert with information" message in accordance with the present invention.

Returning to inquiry 508, if this inquiry is answered in the affirmative, that is, if the received calling party identifying data corresponds to stored identifying data to which priority status has been assigned, instruction 510 is executed, whereupon alert generator 48 is activated to generate a distinctive ringing indication which represents a priority telephone call.

Alternatively, caller ID processor 44 may initiate an alternate routing operation, whereby the incoming call is "forwarded", or relayed, to another station, or to another telephone number, or in accordance with other alternate routing conventions.

Returning to inquiry 512, if this inquiry had been answered in the affirmative, that is, if the received calling party identifying data corresponds to stored identifying data to which "undesired" status had been assigned, instruction 514 is activated by caller ID processor 44. One example of an undesired caller response is not to trigger alert generator 48, that is, to mute the ringing alert. Thus, no indication of this incoming call is provided. Since the user is not made aware of this call, he simply will ignore it. Alternatively, alert generator 48 may be controlled by the caller ID processor so as to provide a distinctive ringing indication which represents an incoming call from an undesired caller. The alert generator may be further controlled to provide different types of ringing indications in accordance with different priorities previously assigned to individual callers.

Figure 2:
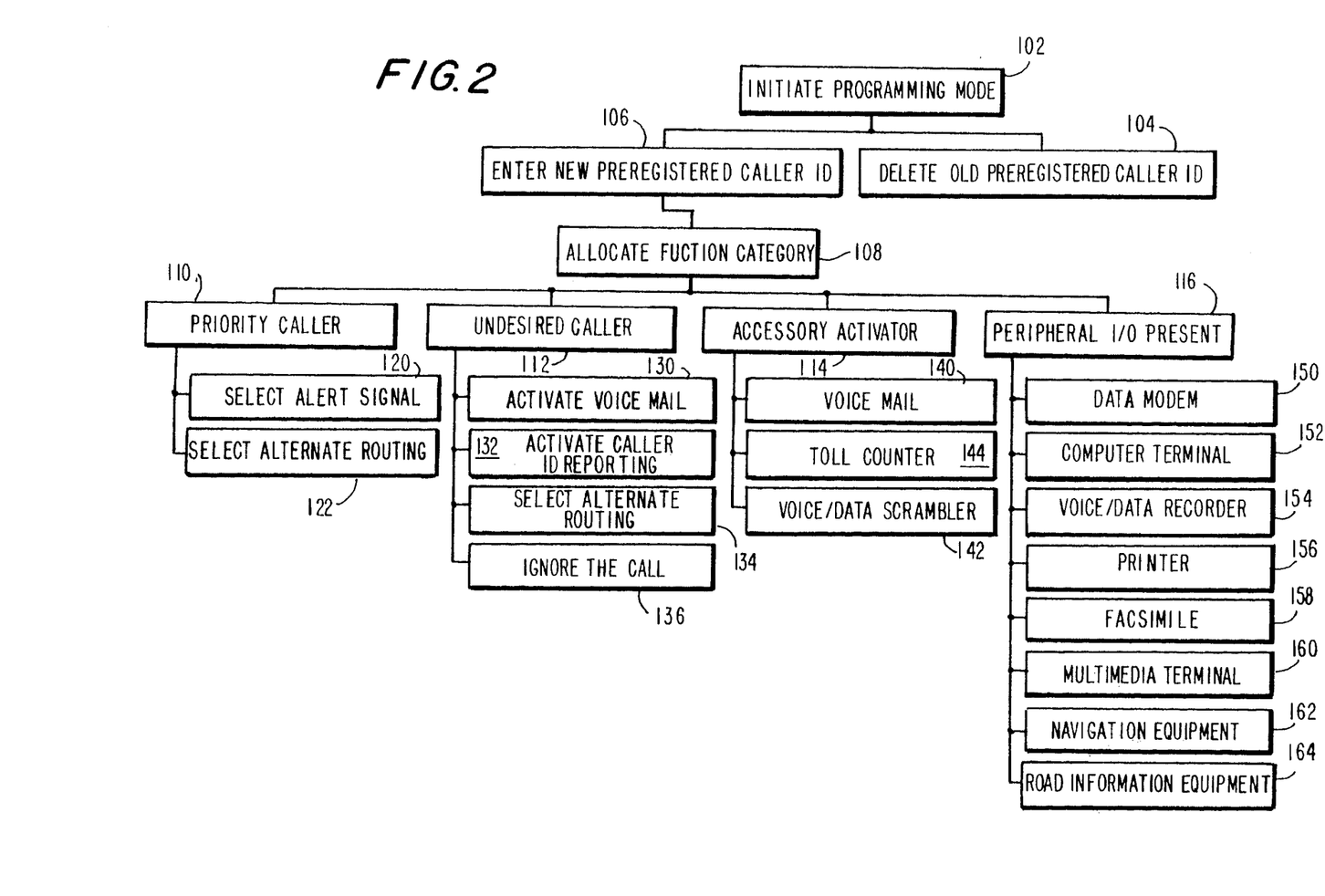
FIG. 2 is a flow chart representing the manner in which a user programs the apparatus shown in FIG. 1 to effect different responses to different calling parties.

As a further alternative, instruction 514 may carry out a pre-programmed response, such as represented by blocks 130, 132 or 134 of FIG. 2. For example, a voice mail system or a voice recorder may be activated to respond to this incoming call.

If inquiry 516 had been answered in the affirmative, instruction 518 is carried out by caller ID processor 44 to activate the particular accessory device that had been assigned by the user to this calling party. For example, if a voice recorder, such as a telephone answering machine, is coupled as an accessory device to the mobile station, and if the voice recorder response category had been assigned to this calling party, then the voice recorder is activated and the caller may communicate with that recorder. Alternatively, if the accessory device is a voice mail system, and if a voice mail response had been assigned by the user to this calling party, then instruction 518 serves to activate the voice mail system.

As a further alternative, if the accessory device comprises a scrambler, and if the user had assigned to this calling party a scramble-type response, then instruction 518 serves to activate the scrambler and the mobile station then communicates with the calling party by way of this scrambler. Thus, voice and/or data information transmitted between the mobile station and the calling party is scrambled.

It will be recognized that incoming information received from the base station is decoded by decoder 36 and coupled to accessory device 50. Also, information from the accessory device is coupled to encoder 18 for transmission to the base station.

If inquiry 520 had been answered in the affirmative, caller ID processor 44 activates peripheral interface 52 and, depending upon the peripheral device connected thereto and the particular peripheral response that had been assigned to this calling party by the user, the appropriate communication protocol is initiated at interface 52 and the peripheral device is activated to communicate with the calling party. Examples of such peripheral devices have been mentioned above, and it will be appreciated that the preselected peripheral device is activated.

If inquiry 522 had been answered in the affirmative, for example, if the area code portion of the calling party identifying data is recognized as a "foreign" area code (i.e. it differs from the area code of the service cell in which mobile station 10 is located), caller ID processor 44 controls alert generator 48 to provide a distinctive ringing signal representative of a "long distance" caller.

While the present invention has been particularly shown and described with reference to a preferred embodiment, it will be readily appreciated by those of ordinary skill in the art that various changes and modifications may be made without departing from the spirit and scope of the invention. For example, alert generator 48 may produce various types of audible alerts as well as visual alerts to notify the user of the different types, or categories, of incoming calls.

It will be appreciated that illustrative accessory and peripheral devices have been discussed above, but the present invention need not be limited unnecessarily only to those specific devices. More generally, the present invention may be used with other devices which have not been specifically described herein, simply by connecting such other devices to suitable interfaces or connections for activation by caller ID processor 44 when the caller ID processor detects a match between calling party identifying data included in the received "alert with information" message and identifying data previously selected by the user and stored in caller ID memory 46. It will be seen that the caller ID processor may comprise a microprocessor of conventional construction; and in one embodiment, if CPU 40 exhibits sufficient capacity and power, the functions carried out by the caller ID processor may be implemented by the CPU.

Therefore, it is intended that the appended claims be interpreted as including the embodiments discussed herein, those alternatives which have been mentioned or suggested above and all equivalents thereto.

What is claimed is:

1. Apparatus for selectively answering an incoming call transmitted from a cellular telephone base station to a mobile station, the incoming call including the telephone number of a calling party, said apparatus comprising, as integral parts of said mobile station:

processor means operable by a user of said mobile station to select telephone numbers representing particular calling parties and to assign predetermined response categories to said particular calling parties;

memory means for storing the selected telephone numbers along with data representing the response categories to which the respective calling parties have been assigned;

means for comparing the telephone number of the calling party which placed the incoming call with the telephone numbers stored in said memory means so as to identify the particular calling party from which the incoming call is being received;

means responsive to said data representing the response category to which the identified calling party has been assigned for initiating a respective one of plural predetermined types of responses to incoming calls as determined by said response categories, said predetermined types of responses including a distinctive ringing indicator to identify a high priority incoming call, a distinctive ringing indicator to identify a long distance incoming call, a muted ringing alert, whereby said user is not informed of the receipt at said mobile station of an incoming call, and a transmitted audio message from a speaker, without user intervention, to identify an incoming call, which speaker is an integral part of the mobile station;

a voice recorder operable to receive said incoming call and selectively actuable to record voice messages received by said mobile station from the calling party;

scrambling means selectively actuable to enable scrambled communication between said mobile station and the calling party;

a facsimile device selectively actuable to receive and display facsimile information received from the calling party, print indicia derived from said facsimile information, and transmit facsimile information to the calling party; and a data modem selectively actuable to communicate data between said mobile station and the calling party, wherein said predetermined types of responses include the activation of said voice recorder, said scrambling means, said facsimile device or said data modem to receive the incoming call from the calling party to which a predetermined response category has been assigned.

2. The apparatus of claim 1 further comprising a data processing terminal selectively actuable to communicate with said calling party and receive and process data received from the calling party and transmit data from the mobile station to said calling party.

3. The apparatus of claim 1 wherein said peripheral device comprises cartographic display means selectively actuable to receive and display cartographic information from the calling party.

4. The apparatus of claim 3 wherein said cartographic information is highway and traffic information.

5. A method of selectively answering an incoming call transmitted from a base station to a mobile station in a cellular telephone system, the incoming call including the telephone number of a calling party to identify said calling party, comprising the steps of:

entering at said mobile station selected telephone numbers representing particular calling parties;

assigning respective types of response categories to the selected telephone numbers;

storing the selected telephone numbers along with data representing the response categories to which the respective calling parties have been assigned in a memory which is an integral part of said mobile station;

comparing the telephone number of the calling party which placed the incoming call with the telephone numbers stored in said memory so as to identify the particular calling party from which the incoming call is being received, said step of comparing being an integral function of said mobile station;

responding to said data representing the response category to which the identified calling party has been assigned by initiating a respective one of plural predetermined types of responses to incoming calls as determined by said response categories, said predetermined types of responses including actuating a distinctive ringing sound representing an incoming call of high priority, actuating a muted ringing sound representing an incoming call of low priority, whereby a user at said mobile station is not apprised of an incoming call received from the calling party to which said muted ringing sound has been allocated, actuating a distinctive ringing sound representing a long distance call, actuating a voice recorder to record voice information spoken by the calling party, actuating a scrambler to enable scrambled communication between said mobile station and the calling party, actuating a data modem to receive data from the calling party, actuating a facsimile device to receive facsimile data from the calling party, actuating the facsimile device to transmit data from the mobile station to the calling party, and transmitting an audio message from a speaker to identify an incoming call; and initiating a default warning indication if the telephone number of the incoming call does not correspond with one of the telephone numbers stored in said memory such that the particular calling party cannot be identified.

6. The method of claim 5 wherein the step of assigning comprises allocating a computer terminal interface function to at least one calling party; and said step of responding comprises actuating a computer terminal to communicate with the calling party if said computer terminal interface function has been allocated to that calling party.

7. The method of claim 5 wherein the step of assigning comprises allocating a traffic information interface function to at least one calling party; and said step of responding comprises actuating a display for receiving from the calling party traffic information data and for displaying said traffic information data if said traffic information interface function has been allocated to that calling party.

* * * * *